US012089010B2

(12) United States Patent
Lee et al.

(10) Patent No.: US 12,089,010 B2
(45) Date of Patent: Sep. 10, 2024

(54) HEARING AID

(71) Applicant: KYUNGPOOK NATIONAL UNIVERSITY HOSPITAL, Daegu (KR)

(72) Inventors: Kyu-Yup Lee, Daegu (KR); Ki Woong Seong, Daegu (KR)

(73) Assignee: KYUNGPOOK NATIONAL UNIVERSITY HOSPITAL, Daegu (KR)

( * ) Notice: Subject to any disclaimer, the term of this patent is extended or adjusted under 35 U.S.C. 154(b) by 278 days.

(21) Appl. No.: 17/607,936

(22) PCT Filed: May 4, 2020

(86) PCT No.: PCT/KR2020/005883
§ 371 (c)(1),
(2) Date: Nov. 1, 2021

(87) PCT Pub. No.: WO2020/222610
PCT Pub. Date: Nov. 5, 2020

(65) Prior Publication Data

US 2022/0295200 A1 Sep. 15, 2022

(30) Foreign Application Priority Data

May 2, 2019 (KR) ........................ 10-2019-0051677

(51) Int. Cl.
*H04R 25/00* (2006.01)

(52) U.S. Cl.
CPC ......... *H04R 25/606* (2013.01); *H04R 25/554* (2013.01)

(58) Field of Classification Search
CPC ............ H04R 2225/023; H04R 25/554; H04R 25/606

(Continued)

(56) References Cited

U.S. PATENT DOCUMENTS 6,077,215 A 6/2000 Leysieffer
6,537,200 B2 3/2003 Leysieffer et al.

(Continued)

FOREIGN PATENT DOCUMENTS

KR 10-2009-0108373 A 10/2009
KR 10-2012-0061859 A 6/2012

(Continued)

OTHER PUBLICATIONS

International Search Report issued in corresponding International Application No. PCT/KR2020/005883 dated Aug. 21, 2020, pp. 1-2, English Translation.

(Continued)

*Primary Examiner* — Phylesha Dabney
(74) *Attorney, Agent, or Firm* — Carter, DeLuca & Farrell LLP

(57) ABSTRACT

Disclosed is a hearing aid in which a receiver is provided in a form implanted into the mastoid antrum. In the hearing aid, an output device is used while being disposed at a position separated from an input device, so that the hearing aid is less affected by feedback and does not have sound feedback even at a high output, and thus the hearing aid is applicable to people having moderate to severe hearing loss. Further, an implantation operation method for locating the output device in the mastoid antrum is simple and it is possible to obtain constant hearing aid performance regardless of the level of the implantation technology of the output device. Still further, a receiver using air as an output medium is implanted into the mastoid antrum, so that the implantable hearing aid has small resistance to the output medium and has high output efficiency.

12 Claims, 5 Drawing Sheets

(58) Field of Classification Search
USPC ........................................................ 381/326
See application file for complete search history.

(56) References Cited

U.S. PATENT DOCUMENTS

| | | | | |
|---|---|---|---|---|
| 8,755,548 | B2 | 6/2014 | Zhao et al. | |
| 2001/0053871 | A1 | 12/2001 | Zilberman | |
| 2011/0144749 | A1 | 6/2011 | Kim et al. | |
| 2011/0280426 | A1* | 11/2011 | Bachler .................. | H04R 25/60 381/328 |

FOREIGN PATENT DOCUMENTS

| | | | |
|---|---|---|---|
| KR | 10-2016-0051960 | A | 5/2016 |
| KR | 10-2018-0111716 | A | 10/2018 |

OTHER PUBLICATIONS

International Preliminary Report on Patentability issued in corresponding International Application No. PCT/KR2020/005883 dated Nov. 2, 2021, pp. 1-5, English Translation.

* cited by examiner

FIG. 4
Mastoid antrum
26a, Incus short process
28. position at
which strapes
25, malleus
26b, Incus long process
hand in operation direction
lateral mastoid anirum
mastoid anirum
mastoid air cell

HEARING AID

GOVERNMENT RIGHTS STATEMENT

This research was supported by a grant (grant number: HR22C1832) of the Korea Health Technology R & D Project through the Korea Health Industry Development Institute (KHIDI), funded by the Ministry of Health & Welfare, Republic of Korea.

CROSS REFERENCE TO RELATED APPLICATIONS

The present application is a national stage application of International Application No. PCT/KR2020/005883, filed May 4, 2020, which claims the benefit of and priority to Korean Application No. 10-2019-0051677, filed May 2, 2019, the entire contents of each of which is hereby incorporated by reference.

TECHNICAL FIELD

The present invention relates to a hearing aid, and more particularly, to a hearing aid provided in a form in which an output device is implanted into the mastoid antrum of the temporal bone (hereinafter, referred to as "mastoid antrum").

BACKGROUND ART

The hearing aid in the related art may be divided into an airway-type hearing aid inserted into the external auditory canal, and an implantable hearing aid implanted into a patient's eardrum, middle ear, or the like. The airway-type hearing aid 10 inserted into the external auditory canal is illustrated in FIG. 1. Referring to FIG. 1, the airway-type hearing aid 10 inserted into the external auditory canal transfers sound in the order of external auditory canal, tympanic membrane, and inner ear, and generates high sound pressure in the external auditory canal to compensate for hearing loss. In the airway-type hearing aid 10 inserted into the external auditory canal, an output device (speaker) inserted into the external auditory canal transmits stimulation (acoustic vibration) to the eardrum in the direction of the ear canal of the eardrum, and the speaker is adjacent to a microphone and an input device (microphone) and the output device (speaker) are exposed to the same medium (air), so that the airway-type hearing aid 10 is greatly affected by feedback, and in particular, there is a problem in that sound feedback increases at a high sound output. Therefore, it is difficult to apply the airway-type hearing aid to people with moderate to severe hearing loss who generally require large amplification.

Conversely, the implantable hearing aid has disadvantages in that an operation for implanting an output device is complex and there is a big difference in efficacy depending on the level of implantation technology of a vibration output device. Further, the vibration output device uses a method of transmitting output vibration through a mechanical connection, so that there are disadvantages in that resistance to output medium is large and thus energy efficiency is low, and a battery use period of the implantable hearing aid is short. Accordingly, there is a demand for a new hearing aid capable of solving the disadvantages of the airway-type hearing aid and the implantable hearing aid in the related art.

SUMMARY

Technical Problems

The present invention is to provide a hearing aid for solving disadvantages of the existing airway-type hearing aid and implantable hearing aid.

The present invention is to provide a hearing aid which is applicable to people with moderate and severe hearing loss due to the small sound feedback, of which an implantation operation is simple, which has energy efficiency, and has high battery use period.

The problem to be solved by the present invention is not limited to the above-mentioned problems, and the problems not mentioned will be clearly understood by those skilled in the art from the present specification and the accompanying drawings.

Technical Solution

An exemplary embodiment of the present invention provides a hearing aid including an input device and an output device.

According to the exemplary embodiment, the input device and the output device may be included in separate housings, respectively, and are separately provided, a first housing including the input device may be inserted into the external auditory canal of a subject and provided in a detachable form, and a second housing including the output device may be provided in a form implanted into the subject.

According to the exemplary embodiment, the input device may include a microphone, and the output device includes a receiver.

According to the exemplary embodiment, the second housing may be used while being attached to a mastoid antrum of the subject.

According to the exemplary embodiment, the second housing may be used while being connected to a bone connected with a tympanum.

According to the exemplary embodiment, the input device and the output device may communicate by using the same medium.

According to another exemplary embodiment of the present invention, a body of the receiver may be disposed within the second housing, a sound output unit of the receiver may be disposed within a third housing, the second housing may be used while being attached to a mastoid antrum of the subject, and the third housing may be attached and used while being spaced apart from the second housing in a direction toward a tympanum.

According to the exemplary embodiment, the hearing aid may further include a circuit device configured to wirelessly transmit power.

According to the exemplary embodiment, the circuit device may be provided within each of the first housing, the second housing, and the third housing.

According to the exemplary embodiment, the second housing and the third housing may be made of a waterproof material and a biocompatible material.

Advantageous Effects

According to the hearing aid according to the exemplary embodiment of the present invention may solve the disadvantages of the existing airway-type hearing aid and implantable hearing aid.

First, unlike that the output device of the existing airway-type hearing aid stimulates the eardrum in the direction of the external auditory canal of the eardrum, the output device of the hearing aid of the present invention stimulates the eardrum in the direction of the tympanum of the eardrum, so that the receiver, that is, output device, is separated from the microphone at the outside of the body and is less affected by feedback, and the input device and the output device use the same medium (air), but the input is outside the body and the output is inside the body, so the present invention is not affected by feedback. Accordingly, the hearing aid does not have sound feedback even at high output and may increase low-frequency output, so that it is possible to apply the hearing aid according to the present exemplary embodiment to people with moderate to severe hearing loss with high output.

Second, the operation of implanting the output device for locating the output device in the mastoid antrum is simple, so that it is possible to implant the output device with a very simple operation compared to the existing implantable hearing aid, and unlike the vibration output device of the existing airway-type hearing aid that shows a large difference in efficacy depending on the level of implantation technology, the hearing aid of the present invention may obtain excellent hearing aid performance even if the output device of the present invention is located anywhere in the closed tympanum.

Third, the vibration output device which transfers output vibration through the mechanical connection is not used, but the receiver using air as the output medium is implanted into the mastoid antrum, so that efficiency of the output device is high. Accordingly, since resistance to the output medium is small, the hearing aid of the present invention is capable of producing a large output even with a low energy supply.

The objects of the present invention is not limited to the above-mentioned objects, and the objects not mentioned will be clearly understood by those skilled in the art from the present specification and the accompanying drawings.

DETAILED DESCRIPTION

Figure 1:
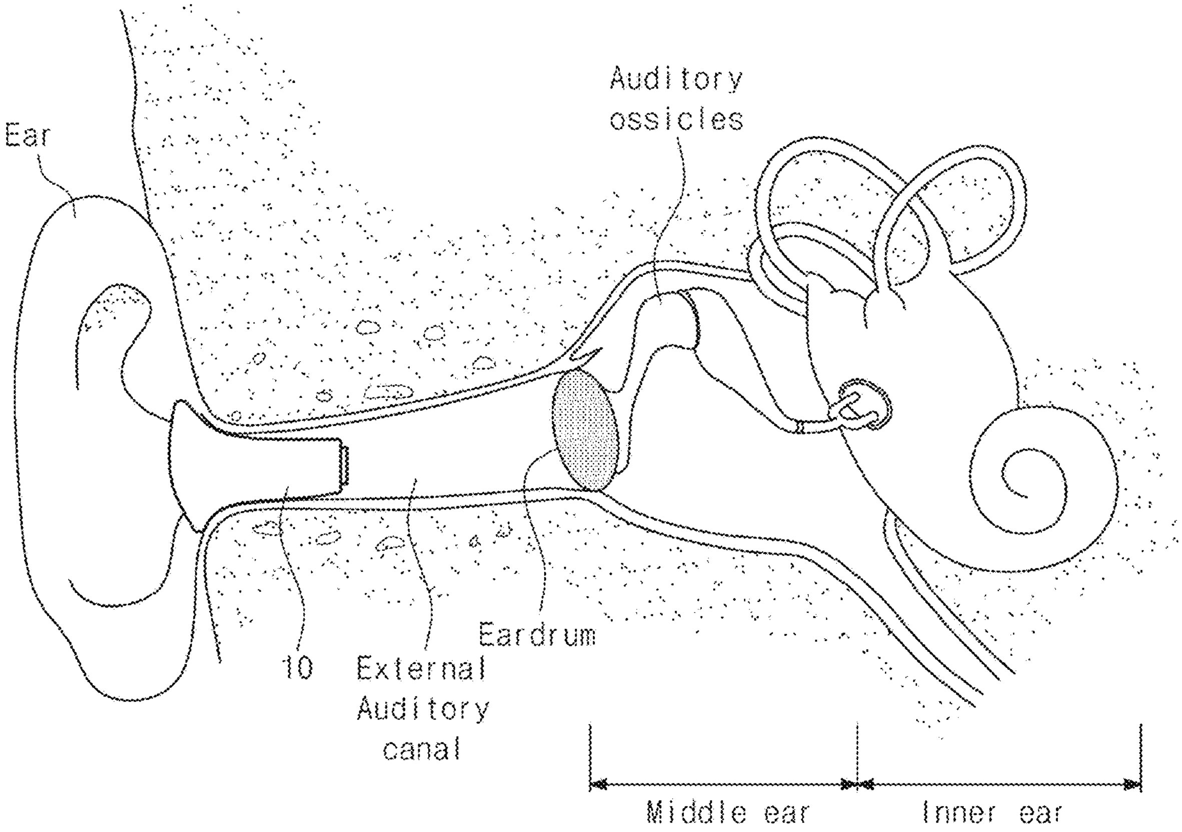
FIG. 1 is a schematic diagram of an airway-type hearing aid according to the related art.

Advantages and characteristics, and a method for achieving them will be clear when exemplary embodiments described in detail with reference to the accompanying drawings are referred to. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims.

Unless defined otherwise, all of the terminologies used herein and containing technical or scientific terminologies have the same meanings as those generally understood by a person skilled in the art to which the present invention pertains. Terms defined in generally used dictionaries shall be construed to have a meaning equal to that in the context of a related technology, and shall not be construed as ideal or excessively formal meanings, unless clearly defined in the present specification.

The terms used in the present specification is for the purpose of describing the exemplary embodiments, and are not intended to limit the present invention. In the present specification, a singular form includes a plural form as well, unless otherwise mentioned. A term "comprises" and/or various conjugations of this term, for example, "comprise", "comprising", and "comprised" do not exclude the existence or addition of one or more other compositions, ingredients, constituent elements, steps, operations, and/or elements, in addition to the mentioned composition, ingredient, constituent element, step, operation, and/or element. In the present specification, the term "and/or" refers to each of the listed components or various combinations thereof.

A singular expression includes a plural expression unless it is specifically described to the contrary in the context. Accordingly, shapes, sizes, and the like of the elements in the drawing may be exaggerated for clearer description.

The "~ unit" used throughout the specification is a unit processing at least one function or operation, and may refer to, for example, software and a hardware component, such as FPGA or ASIC. However, the "~ unit" is not limited to software or hardware. the "~ unit" may be configured to reside in an addressable storage medium or may be configured to reproduce one or more processors.

Accordingly, as an example, the "~ unit" includes components, such as software components, object-oriented software components, class components, and task components, and processes, functions, attributes, procedures, subroutines, segments of a program code, drivers, firmware, micro-codes, circuits, data, database, data structures, tables, arrays, and variables. The functions provided from the constituent element and the "~ unit" may be performed separately by a plurality of constituent element and the "~ units" and may also be combined with other additional constituent elements.

Figure 2:
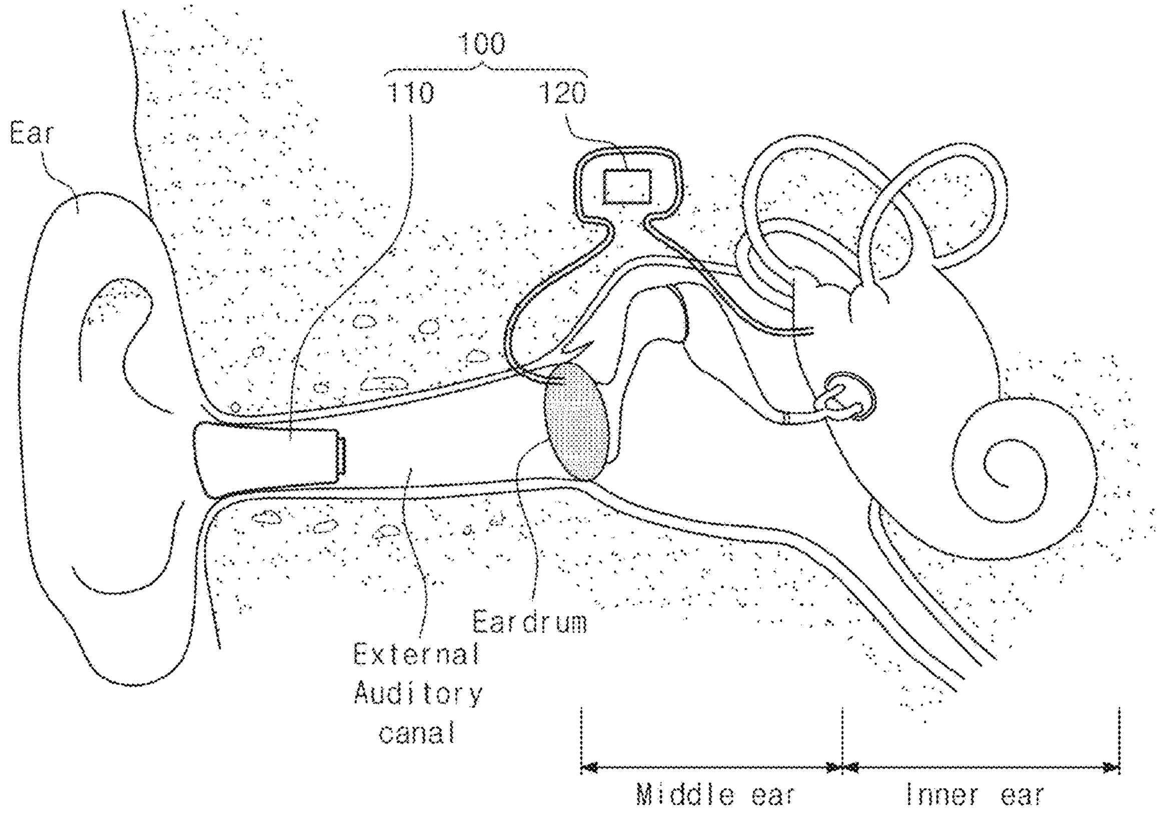
FIG. 2 is a schematic diagram of a hearing aid according to an exemplary embodiment of the present invention.

FIG. 2 is a schematic diagram of a hearing aid according to an exemplary embodiment of the present invention.

The hearing aid 100 according to the present invention may include an input device and an output device. According to an example, the input device and the output device may be included in separate housings, respectively, and may be separately provided. According to the exemplary embodiment, the input device may be provided while being included in a first housing 110. According to the exemplary embodiment, the output device may be provided while being included in a second housing 120. According to the exemplary embodiment, the first housing 110 and the second housing 120 may be used while being disposed at physically separated positions.

According to the exemplary embodiment, the first housing 110 may be provided in a shape insertable into the external auditory canal. According to the exemplary embodiment, a portion of the first housing 110 inserted into the external auditory canal may be provided in a cylindrical shape, and the remaining portions that are not inserted into the external auditory canal may be provided in a shape having a larger diameter than that of the inserted portion. According to the exemplary embodiment of the present invention, the first housing including the input device may be provided in a form which is inserted into the external auditory canal of a subject and is detachable.

According to the exemplary embodiment, the first housing 110 may be provided in any one type of an open type or an earring type.

The first housing 110 may include the input device. According to the exemplary embodiment, the input device may include a microphone. According to the exemplary embodiment, the input device may further include an amplifier.

The microphone may receive an external acoustic sound and convert the received acoustic sound to an electronic signal. The amplifier may selectively amplify an acoustic electric signal. The amplifier may include an OP-AMP.

According to the exemplary embodiment, the second housing 120 may be provided in a cube shape. According to the exemplary embodiment, the second housing 120 may be provided in a size disposable within the mastoid antrum. According to the exemplary embodiment, the second housing 120 may be provided in the form that can be implanted into a subject. The second housing 120 may be made of a biocompatible material. Further, the second housing 120 may be made of a water-proof material. The second housing 120 may be made of an elastic material. Through this, even though the hearing aid is implanted into the subject and is operated, the hearing aid is usable without fear of failure.

The second housing 120 may include the output device. According to the exemplary embodiment, the output device may include a receiver. The receiver may change the amplified electric signal received from the amplifier included in the input device to an acoustic signal and transmit the changed acoustic signal to the inner ear.

According to the exemplary embodiment, the first housing 110 and the second housing 120 may further include a circuit device. According to the exemplary embodiment, the circuit device may include a power device which is capable of operating the receiver. According to the exemplary embodiment, the circuit device may be a battery. The circuit device may be a wirelessly drivable power device.

According to the exemplary embodiment of FIG. 2, the output device may be provided while being attached to the mastoid antrum. According to the exemplary embodiment, the output device may be provided while being attached to the bone connected with the tympanum of the subject.

Since the existing implantable hearing aid uses the form that the output device transmits sound by using vibration, there is a problem in that a size of the output transmitted is different depending on the position to which the output device is attached.

The hearing aid according to the exemplary embodiment of the present invention is characterized in being provided in the form in which the second housing including the output device is implanted into the subject as illustrated in FIG. 2. The position to which the second housing is attached may be the mastoid antrum of the subject. According to the hearing aid 100 according to the exemplary embodiment of the present invention, it is possible to solve the disadvantages of the existing airway-type hearing aid and implantable hearing aid.

The output device of the hearing aid of the present invention uses air as medium unlike the existing implantable hearing aid, so that sound is transmittable through the empty tympanum, thereby achieving an effect in that the response speed is more faster.

According to the exemplary embodiment, the communication between the output device and the input device of the present invention may be established by using the same medium. According to the exemplary embodiment, the output device according to the present invention may transmit the sound signal by using air as output medium.

That is, according to the present invention, the output device is provided while being disposed within the second housing and the second housing is used while being attached to the mastoid antrum, so that the sound transmitted from the amplifier included in the first housing is propagated and provided from the mastoid antrum to the aditus ad antrum and the tympanum. The tympanum and the mastoid antrum are connected with each other.

In the case of the existing hearing aid, both the input device and the output device are disposed on the side of the external auditory canal to stimulate the eardrum to vibrate the auditory ossicles. However, in the present invention, the input device is disposed at the existing position and the output device is implanted into and disposed at the mastoid antrum of the subject to stimulate the eardrum at the opposite side of the external auditory canal, that is, at the side of the tympanum, to vibrate the auditory ossicles. That is, the sound entering in the order of the mastoid antrum, the aditus ad antrum, and the tympanum stimulates the back side of the eardrum and the stimulation vibrates the auditory ossicles, which has the effect of transmitting the acoustic signal to the inner ear.

The present invention compensates for hearing loss by generating high sound pressure inside the eardrum and the tympanum, and the output device is disposed at the separate position in the opposite direction of the input device provided while being inserted into the external auditory canal based on the eardrum and is implanted into the mastoid antrum, thereby solving sound feedback that is the drawback of the airway-type hearing aid. Accordingly, according to the exemplary embodiment, unlike that the sound output device of the existing airway-type hearing aid stimulates the eardrum in the direction of the external auditory canal of the eardrum, the hearing aid of the present invention stimulates the eardrum in the direction of the tympanum, so that the output device is separated from the input device and is less affected by feedback, and the input device and the output device use the same medium (air), but the input is outside the body and the output is inside the body, so the hearing aid is not affected by feedback.

According to another exemplary embodiment of the present invention, a receiver included in an output device according to the present invention may include: a body; and a sound output unit. In this case, the body and the sound output unit may be provided while being separated from each other. According to the exemplary embodiment, the body of the receiver may be disposed within the second housing 120, and the sound output unit of the receiver may be disposed within a third housing (not illustrated). According to the exemplary embodiment, the second housing and the third housing may be made of a waterproof material and a biocompatible material.

According to the exemplary embodiment, the second housing 120 included in the body may be used while being attached into the mastoid antrum, and the third housing (not illustrated) including the sound output unit may be attached and used while being spaced apart from the second housing 120 in the direction toward the tympanum. In this case, the sound output unit is disposed in the direction toward the tympanum, so that the transmission of the sound may be processed at a higher speed. According to the exemplary embodiment, the second housing included in the body of the receiver may be implanted into a mastoid process, and the third housing including the sound output unit of the receiver may be implanted to be in contact with or adjacent to the aditus ad antrum or to be spaced apart from the aditus ad antrum by a predetermined distance (within several cm or several mm).

The present invention is characterized in the structure in which the output device is separated and is implanted into and disposed in the mastoid antrum in the integrated airway-type hearing aid in the related art of FIG. 1.

When the hearing aid according to FIG. 2 is actually used, the first housing including the microphone and the amplifier may be connected with the interior of the external auditory canal in the form of being inserted into the outside of the body, that is, the external auditory canal, and the second housing including the receiver is disposed while being implanted into the mastoid antrum, so that the hearing aid according to FIG. 2 may be used in the same way as the existing airway hearing aid in real life.

Figure 3:
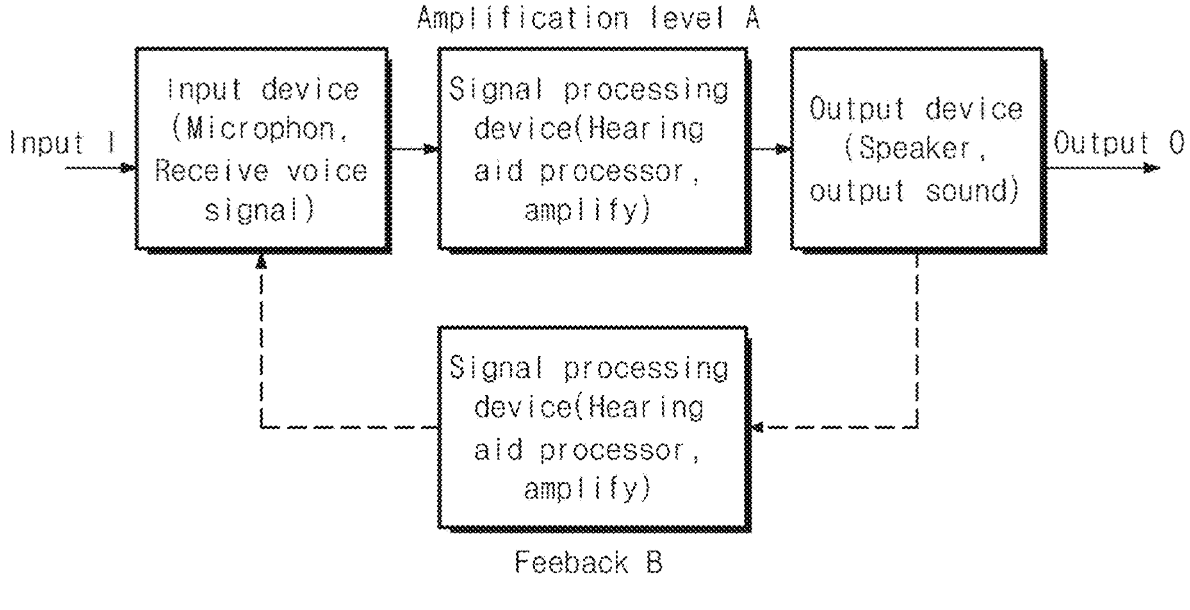
FIG. 3 is a schematic diagram illustrating sound feedback of the hearing aid.

FIG. 3 is a schematic diagram illustrating sound feedback of the hearing aid.

Referring to FIG. 3, in the airway-type hearing aid inserted into the external auditory canal, the input device and the output device are exposed to the same medium, that is, the air, so that the airway-type hearing aid is greatly affected by feedback. Accordingly, there is a problem in that the airway-type hearing aid cannot be applied to people with moderate to severe hearing loss who generally require a large amplification level.

However, the hearing aid according to the exemplary embodiment, the input device and the output device use the same medium (air), but the input is outside the body and the output is inside the body, so the hearing aid is not affected by feedback. Accordingly, the hearing aid does not have sound feedback even at high output and may increase low-frequency output, so that it is possible to apply the hearing aid according to the present exemplary embodiment to people with moderate to severe hearing loss with high output.

That is, in the case of the existing airway-type hearing aid, because feedback occurs, the output O=I*A is not obtained, but the output O=I*A+O*B*A is the result, and when the output value is large in the level at which O*B*A due to the feedback cannot be ignored, the output is oscillated, so that there is a problem in that it is difficult to normally transfer sound.

However, in the present invention, even though the output value is large, the hearing aid is not affected by the output, so that there is an effect in that the hearing aid of the present invention is easily applicable to people with moderate to severe hearing loss.

Further, according to the exemplary embodiment of the present invention, the operation of implanting the output device to the mastoid antrum corresponds to a very simple operation compared to the operation of the existing airway-type hearing aid, so that both the patient and the medical staff may be satisfied. Unlike the vibration output device of the existing airway-type hearing aid that shows a large difference in efficacy depending on the level of implantation technology, the hearing aid of the present invention may obtain excellent hearing aid performance even if the output device of the present invention is located anywhere in the closed tympanum.

Further, according to the exemplary embodiment of the present invention, the vibration output device which transfers output vibration through the mechanical connection is not used, but the receiver using air as the output medium is implanted into the mastoid antrum, so that efficiency of the output device is high. Accordingly, since resistance to the output medium is small, the hearing aid of the present invention is capable of producing a large output even with a low energy supply. The vibration output device transfers the output vibration through the mechanical connection, but the receiver uses the air as the output medium. This means that since resistance of the receiver to the output medium is small, the receiver is capable of producing a large output even with a low energy supply.

Figure 4:
FIGS. 4 and 5 are diagrams describing an implantation position and an implantation structure of an output device of the implantable hearing aid according to the exemplary embodiment of the present invention.
Figure 5:
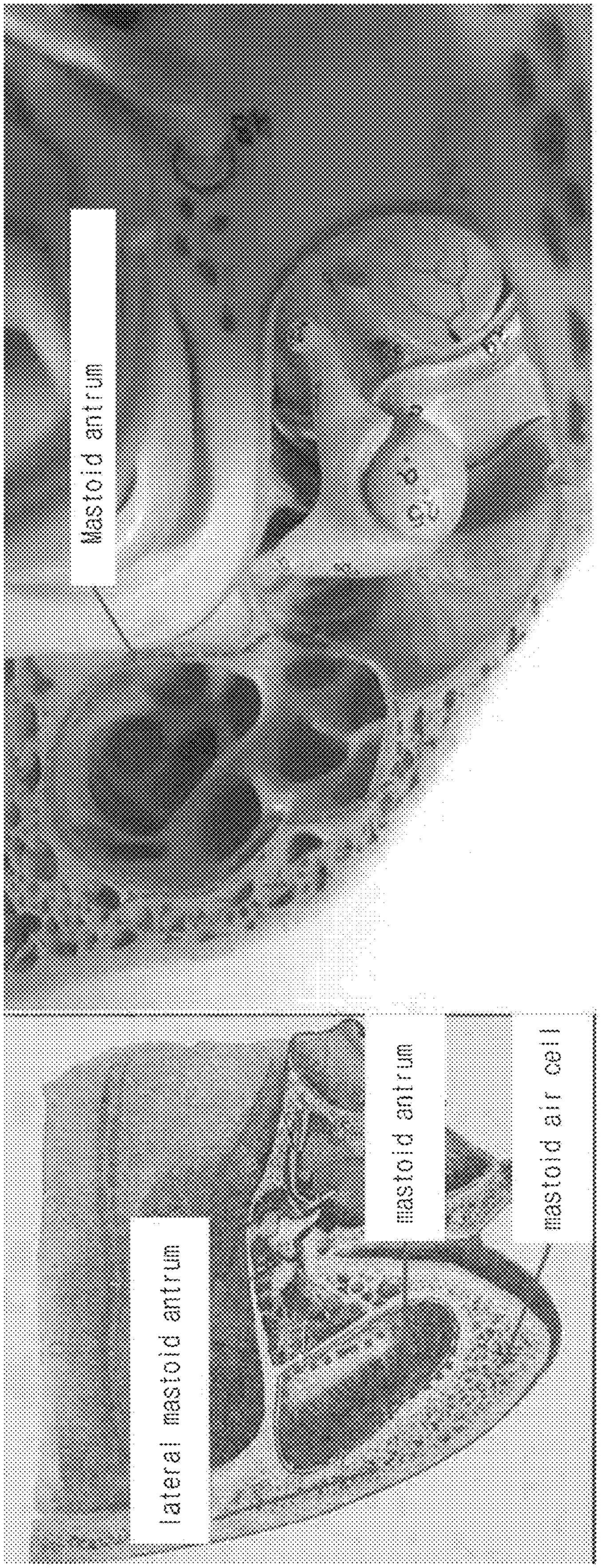

FIGS. 4 and 5 are diagrams describing an implantation position and an implantation structure of the output device of the implantable hearing aid according to the exemplary embodiment of the present invention.

Referring to FIGS. 4 and 5, the output device of the hearing aid is implanted into the mastoid antrum. The output device may be implanted into the mastoid antrum through an incision in the lateral mastoid antrum corresponding to the outside bone of the mastoid antrum. A plurality of mastoid air cells exists between the soft bones in the temporal bone and the mastoid antrum means the largest room I the plurality of air cells. The mastoid air cell refers to a room slightly smaller than the mastoid antrum. The aditus ad antrum refers to the entrance from the mastoid antrum to the tympanum where the auditory ossicles are present.

In the exemplary embodiment of the present invention, the output device of the hearing aid may be implanted into a lateral surface, a bottom surface, and the like of the mastoid process (one portion of the temporal bone) within the mastoid antrum. The output device may be implanted into the mastoid process within the mastoid antrum by a bonding method, screw engagement, and the like. The output device according to the exemplary embodiment of the present invention may form a constant sound pressure in an arrow space and efficiently transfer acoustic energy to the eardrum regardless of the mounting method and the mounting direction/position. The output device may be implanted so that the sound output direction is directed toward the aditus ad antrum or toward an upper, lower, or left/right lateral portion of the aditus ad antrum. In another exemplary embodiment of the present invention, the output device of the hearing aid may also be implanted into the aditus ad antrum. In another exemplary embodiment of the present invention, the body of the receiver included in the output device of the hearing aid is implanted into the mastoid process and the sound output unit of the receiver may be implanted to be in contact with or be close to the aditus ad antrum or to be spaced apart from the aditus ad antrum by a predetermined distance (with several cm or several mm).

Figure 6:
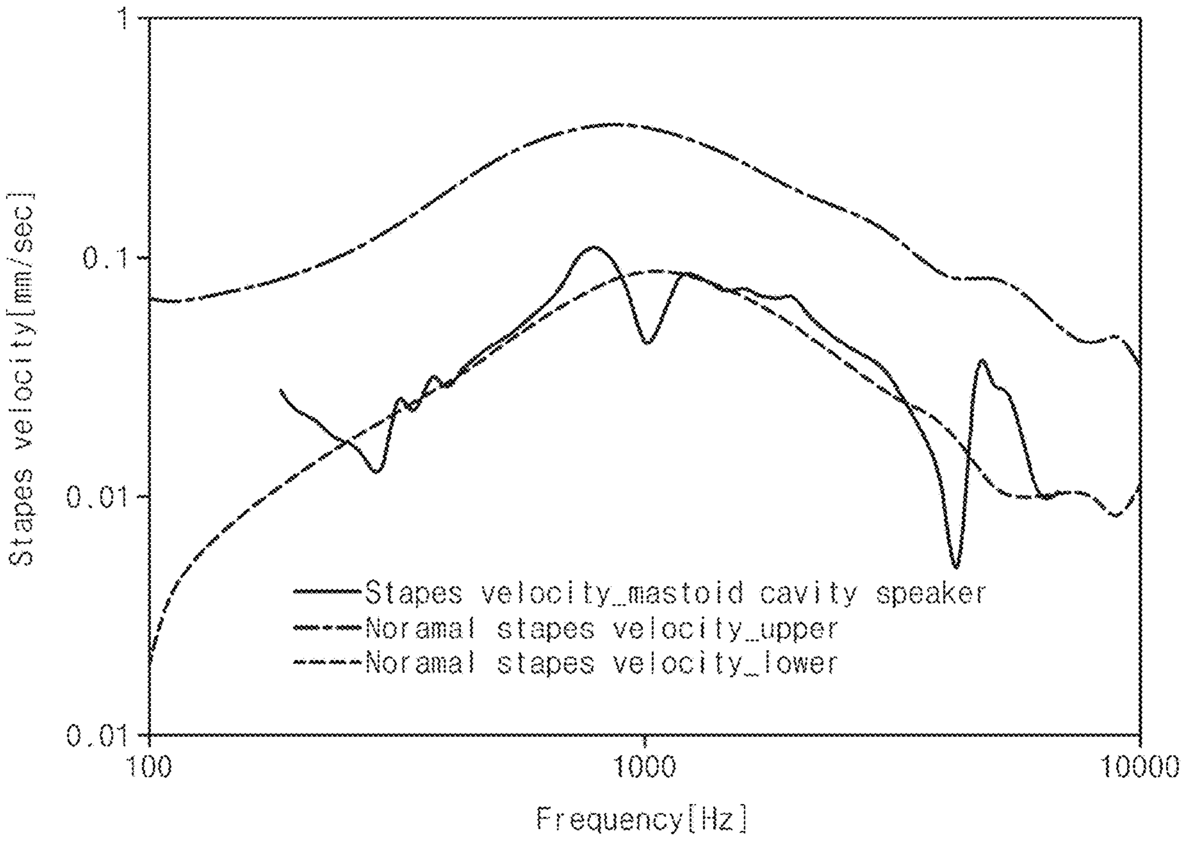
FIG. 6 is a graph illustrating a result of an experiment through the hearing aid according to the present invention.

FIG. 6 is a graph illustrating a result of an experiment through the hearing aid according to the present invention.

According to the existing invention, as the hearing aid that uses sound (density of air) as the transmission medium, the airway-type hearing aid inserted into the external auditory canal is generally used. The output device of the existing airway-type hearing aid transmits sound through the eardrum, and the characteristic evaluation method of the output device of the hearing aid having the foregoing form is specified in ASTM-F2504.

The dotted line shown in the graph of FIG. 6 is a measurement of the vibration characteristics of the stapes when a sound pressure of 94 dB SPL is applied, and represents a lower limit and an upper limit of a normal person, and the reference points are specified in ASTM-F2504.

FIG. 6 is the experiment result graph showing the result of checking whether sound is smoothly transmitted when the receiver is implanted into the mastoid antrum according to the present invention.

In the present invention, a cadaver experiment was performed to check whether sound can be transmitted through the mastoid antrum, and the experiment result is shown as a solid black line in FIG. 6.

According to the experiment result graph according to FIG. 6, when a sound pressure of about 94 dB SPL is generated in the mastoid antrum, the sound transmitted to the stapes is at a level sufficient to compensate for hearing loss (the range within the range of the normal people), and in this case, no external feedback is measured, so that it can be confirmed that the present invention may sufficiently replace the existing implantable hearing aid.

The invention claimed is:

1. A hearing aid, comprising:

an input device; and an output device, wherein the input device and the output device are included in separate housings, respectively;

a first housing including the input device configured to be inserted into an external auditory canal of a subject and provided in a detachable form;

a second housing including the output device configured to be implanted into the subject; and a third housing including a sound output unit of a receiver configured to be implanted into the subject and spaced apart from the second housing, wherein the first housing is spaced apart from the third housing.

2. The hearing aid of claim 1, wherein the input device includes a microphone, and the output device includes the receiver.

3. The hearing aid of claim 2, wherein a body of the receiver is disposed within the second housing, the second housing is configured to be attached to a mastoid antrum of the subject, and the third housing is attached and configured to be spaced apart from the second housing in a direction toward a tympanum.

4. The hearing aid of claim 3, further comprising:

at least one circuit device configured to wirelessly transmit power, wherein the at least one circuit device is provided within the first housing, the second housing, and the third housing, and the second housing and the third housing are made of a waterproof material and a biocompatible material.

5. The hearing aid of claim 2, further comprising:

at least one circuit device configured to wirelessly transmit power.

6. The hearing aid of claim 5, wherein the at least one circuit device is provided within the first housing and the second housing.

7. The hearing aid of claim 1, wherein the second housing is configured to be attached to a mastoid antrum of the subject.

8. The hearing aid of claim 1, wherein the second housing is configured to be connected to a bone connected with a tympanum.

9. The hearing aid of claim 1, wherein the input device and the output device communicate by using the same medium.

10. The hearing aid of claim 9, wherein the medium is air.

11. The hearing aid of claim 1, wherein the second housing is made of a waterproof material and a biocompatible material.

12. The hearing aid of claim 1, wherein both the input device and the output device are disposed on a side of an external auditory canal to stimulate the eardrum to vibrate auditory ossicles.

* * * * *